Aug. 28, 1962     A. W. RYTINA     3,050,738
GLOVE
Filed Nov. 5, 1959

INVENTOR.
ANTON W. RYTINA
BY Pyle & Fisher
Attys.

United States Patent Office 3,050,738
Patented Aug. 28, 1962

3,050,738
GLOVE
Anton W. Rytina, Coshocton, Ohio, assignor to
Edmont Inc., a corporation of Ohio
Filed Nov. 5, 1959, Ser. No. 851,117
12 Claims. (Cl. 2—167)

This invention pertains to a glove having a novel and improved glove material and to a method of making such material.

In the art of manufacturing gloves, the practice of applying a plastic reinforcing and protective coating to the outer surface of a fabric substrate is well established. Often the reinforcing coating is the fusion product of a composition which has as its principal ingredients, polyvinyl chloride resin and a suitable plasticizer. These compositions are known generically as plastisols. Plastisols are vinyl chloride polymer-plasticizer pastes, made without volatile solvents. As used herein this term is intended to cover such pastes made with polymeric vinyl chloride including, in addition to polyvinyl chloride itself, copolymers of vinyl chloride with minor amounts of comonomers, such as vinyl acetate, vinyl ethyl ether, acrylonitrile, vinylidene chloride, etc.

In the past many proposals have been made for improving the grip characteristics of gloves impregnated or coated with the reaction product of a plastisol. One such proposal has been to apply relatively finely ground particles. The chemical composition of such particles is often an elastomer such as neoprene. These elastomer particles are known generically in the glove industry as "flock material" or simply as "flock." In the past elastomer particles have been applied to the surface of the gloves as by sprinkling or blowing the elastomer material onto a coated glove before the plastisol is cured. With a "flocking" technique, the particles are blown against the wet plastisol and held there by the inherent tackiness of the plastisol.

While the previously applied elastomer particles tended to increase the grip characteristics of a glove, and usually the cut resistance as well, the wear characteristics of the glove were appreciably affected. It is believed that the explanation for this is that the elastomer particles tended to abrade away quickly leaving small recesses where the abraded particles had previously been secured to the glove.

It has been discovered that the grip characteristics of a plastisol coated or impregnated glove can be enhanced by the addition of elastomer particles, while at the same time the wear characteristics are actually improved. The life of the glove can be increased. The flexibility can also be increased.

These listed attributes and others are accomplished by firmly imbedding elastomer particles of a suitable elastomer system in the plastisol coating. Method-wise, this imbedding is accomplished by thoroughly mixing the elastomer particles into the plastisol solution before it is applied to the surface of a fabric to be coated or impregnated. This pre-mixing assures thorough dispersion of the elastomer particles through the plastisol and thorough wetting of those particles with the plasticizer. The resultant admixture is then applied to a surface of the fabric to be protected. The finished and protected fabric produces a glove of outstanding characteristics.

In addition to the improved grip and flexibility characteristics, and the surprising improvement in wear properties, these gloves have a very unique and somewhat unexplainable property. The finished material from which they are made is porous. The porosity is enhanced if the admixture is applied to the fabric by a calendering process. It is even further enhanced if the fabric is a knitted jersey or the like.

In modern merchandising of gloves, the appearance becomes an extremely important factor. This is exceptionally important where so-called impulse buying is concerned. As an example, work gloves can readily be sold to truck drivers through counter displays of those gloves in appropriate places of business such as restaurants which have become known as "truck stops." With such merchandising, eye appeal is extremely important. The present glove lends itself extremely well to this type of merchandising because another of its advantages is that extremely attractive products can be made. Interesting effects can be obtained by varying and mixing the colors of both the elastomer particles and the plastisol.

Accordingly, one of the principal objects of the invention is to provide a novel and improved plastic coated glove which is comfortable to the wearer.

A related object of the invention is to provide an improved plastic coated glove which has better flexibility, grip, and wear characteristics than prior known plastic coated gloves.

Another major object of the invention is to provide a novel and improved plastic coated glove in which a porous but nonetheless continuous coating is provided.

An additional object of the invention is to provide a novel and improved plastic coated glove which has an unusual and attractive appearance.

A further object of the invention is to provide a novel and improved method of manufacturing a glove to provide a glove having the previously listed improved characteristics.

A related object of the invention is to provide an improved method of manufacture which readily lends itself to the production of gloves of a wide variety in appearance.

Other objects and a fuller understanding of the invention may be had by referring to the following description and claims, taken in conjunction with the accompanying drawing in which:

Figure 1:
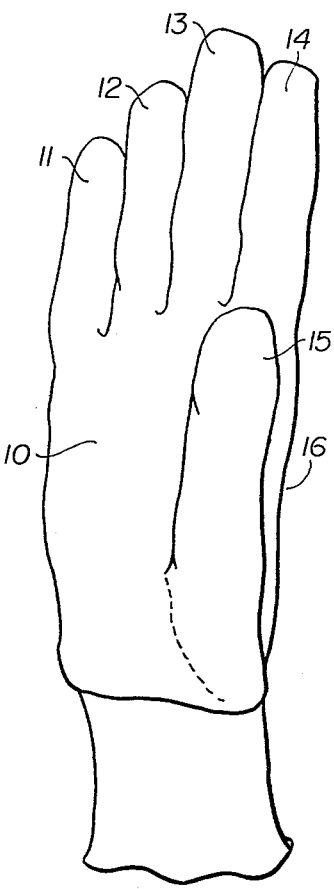
FIGURE 1 is a perspective view of a glove made in accordance with the teachings of this invention.

In FIGURE 1 a perspective view of a glove made in accordance with this invention is shown. In that view the usual palm portion 10, finger stalls 11, 12, 13, 14 and thumb stall 15 are shown. A small part of the usual back portion 16 is also visible in the drawing.

Figure 2:
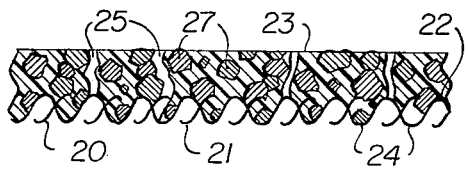
FIGURE 2 is a sectional view as seen in the plane indicated by the line 2—2 of FIGURE 1, showing a portion of the glove material on a greatly enlarged scale with respect to FIGURE 1.
Figure 3:
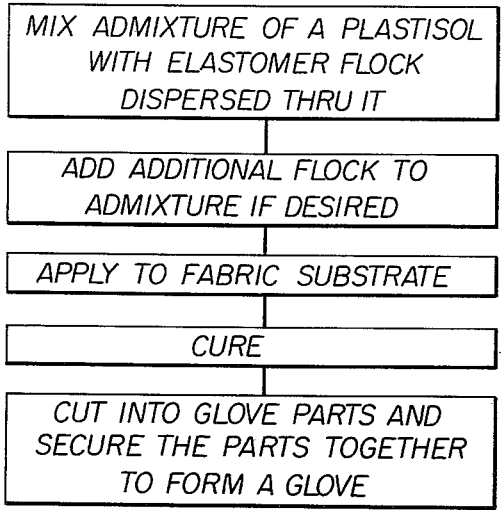
FIGURE 3 is a diagrammatic view explaining the novel and improved process of producing the improved glove.

In FIGURE 2 the features of the invention are more apparent, and a greatly enlarged sectional view is shown. For clarity of illustration the parts shown in FIGURE 2 are not necessarily scaled accurately. In this figure a suitable fabric substrate is designated by the numeral 20. The fabric 20 may be a regular woven fabric. For reasons which will be explained more fully below, the preferred fabric is one of a rather open weave such as a knitted jersey. For wear, or comfort and warmth, inner surface 21 of the fabric is napped.

The fabric 20 has an outer surface 22 which is covered by a plastic coating 23. This plastic coating 23 is of a type which may be identified by a rather inconsistent phrase. This phrase is that the coating 23 is a continuous discontinuous coating. The coating is continuous in that it is adhered to substantially all of fibers 24 which make up the fabric 20. It is also continuous in the sense that it covers the entire outer surface 22. The coating 23 is discontinuous in the sense that an infinite number of pores 25 extend through it. The pores 25, as shown in FIGURE 2, are greatly exaggerated in size for clarity of illustration.

Further, as will be explained in more detail below, the size of the pores varies according to the porosity of the fabric 20. The pore size is also dependent on the process by which the coating 23 is applied to the fabric 20.

The coating 23 includes a large number of small discrete particles 27. These particles 27 are referred to in the glove industry as "flock." "Flock" material, at least in the context of this disclosure, consists of a series of finely divided particles of most any elastomer system. The particles may be either sponge or solid in nature, that is, particles which are either cellular or non-cellular in nature. To illustrate the range of elastomer systems which are satisfactory with the present invention, neoprene, natural rubber, GRS rubber and butyl rubber elastomer particles are all examples of satisfactory material. Neoprene is the preferred material. The reason for this preference is that there is an apparent migration of plasticiser into the elastomer particles when neoprene elastomer particles are dispersed through a plastisol solution and better adhesion between the elastomer and vinyl chloride polymer seems to be effected.

Method of Making the Glove

The first step in making one of the improved gloves of this invention is to compound or mix the plastisol solution which is used to coat the fabric substrate. One novel feature of the formulation of this solution is that at least part of the elastomer particles are charged directly into the mixing vat along with the material which are used to compound the usual plastisol.

An example of the typical solution is:

| Material: | Parts by weight |
|---|---|
| Polyvinyl chloride | 100 |
| Dicapryl phthalate | 85 |
| Butyl benzyl phthalate | 20 |
| Epoxidized vegetable oil | 15 |
| Dibasic lead phosphite | 4 |
| Calcium silicate | 6.5 |
| Titanium oxide | 6.4 |
| #40 mesh neoprene | 10 |

The dicapryl and butyl benzyl phthalate and the epoxidized vegetable oil are typical plasticizers. The dibasic lead phosphate is a typical stabilizer while the calcium silicate and titanium oxide are suitable fillers. The titanium oxide is, of course, also a pigment.

A table of ranges for the composition is as follows:

| Material: | Parts by weight |
|---|---|
| Polyvinyl chloride resin | About 100 |
| Plasticizer | About 100–150 |
| Stabilizer | About 4–6 |
| Filler | 10–25 |
| 30–150 mesh elastomer particles | About 10–75 |

As will be seen, the above example gives 236 parts plastisol to 10 parts of elastomer particles. After this example formulation has been mixed together, additional flock particles may be added as desired. It is preferred that the plastisol be mixed first with about 10 parts as indicated. Thereafter any desired amount of elastomer particles may be added up to about 65 additional parts. The preferred range is up to about 40 additional parts. In other words, a total of about 10 to 75 parts elastomer particles to approximately 100 parts polyvinyl chloride gives the desired effect. The preferred range has from 10 to 50 parts of elastomer particles. Very outstanding results have been obtained with elastomer particles in the range of from 25 to 35 parts to about 230 parts of a typical plastisol solution having 100 parts polyvinyl chloride.

The elastomer particles is from 30 to 150 mesh in size. Composition-wise, as previously indicated, a wide variety of elastomers provide suitable elastomer particles. Neoprene is the preferred system.

After the plastisol solution has been mixed and the additional elastomer particles added as desired, the resultant admixture is applied to one surface of the chosen fabric substrate. Knife coating is one satisfactory technique for this application. Where high porosity and exceptional wear are desired, calendering is the preferred process.

After the plastisol and elastomer particles admixture has been applied to the surface of the fabric, a typical curing operation for polyvinyl chloride is effected. This curing operation may be performed under radiant heaters for a suitable period of time such as about one minute. A temperature of from 225° to 400° F. is satisfactory for the curing operation.

After the admixture has been cured, the coated material may be cut to any one of the standard glove patterns. The parts provided by this cutting are then fixed together, as by sewing, to provide the finished glove.

Finished Product

A glove made according to the foregoing description has extraordinary characteristics. Foremost among these is that the glove is very comfortable to the wearer. It is soft and pliable, and it will retain these characteristics throughout its life. Such is not the case with all coated gloves.

As has been indicated above, the glove has highly superior grip characteristics. It is believed that the explanation for the superior grip characteristics of a glove made according to this invention is that the plasticizer migrates from the vinyl into the elastomer particles. This seems to soften the elastomer particles to produce the superior grip characteristics and to effect the improved bonding between the elastomer particles and the plastisol.

The reasons for porosity which improves the comfort of the glove are not fully understood. Perhaps the explanation for the breathing film lies in the heterogeneous character of the coating. Further, it is believed that the preferred calendering process results in greater porosity because it tends to squeeze away the plastisol and thus thicken the admixture. This thickening seems to inhibit the spreading of the protective coating as it is applied to the fabric substrate. Apparently, the coating tends to adhere to the fibers of the fabric and not run together to close the pores between the fibers. Of those samples of materials made in accordance with this invention that have been tested, permeabilities of about 2.5 cubic feet per minute per square foot with a water resistance of 29 cm. have been found. This compares with air permeability of 1.8 cubic feet per minute per square foot and water resistance of 52 cm. for standard 9 oz. cotton oxford cloth. It is believed that these porosities are quite remarkable in that the usual plastisol glove is essentially impervious.

The air permeability was measured through use of U.S. Navy Test Method 5450 of May 15, 1951. This test consists of covering an intake orifice to a chamber with a specimen to be tested. Air is exhausted from the chamber by an exhaust fan and the pressure drop is measured by a manometer. From this measurement and the area of the orifice the air permeability is computed. Standard conditions for this test are: temperature 70° F., humidity 65%, and barometric pressure of 30 inches of mercury.

The water resistance is measured by the Low Range Hydrostatic Pressure Method of Navy Test Method 5514 of May 15, 1951. Under this test a head of water at 80° F plus or minus 5° is placed on the top of a sample of cloth. A measurement is then made of the head required to cause water to appear at three places on the side of the cloth opposite the water.

Whatever the reasons for the effects obtained, the fact remains that a highly superior glove is obtained. The minute pores greatly increase the comfort of the wearer when he wears one of these gloves for working in a warm atmosphere. The porosity seems to facilitate the escape of perspiration and perhaps to permit sufficient breathing through the glove to cool the wearer's hand.

At the same time the glove has a good deal of comfort when worn for warmth. Perhaps the explanation is that even though the protective coating is porous, the pores are very minute. They are hardly visible to the naked eye. Thus, the glove material seems to retain a fair amount of trapped air providing insulation both to keep warmth in and to keep warmth out, depending on the ambient temperature, while, at the same time, permitting the escape of perspiration, perhaps in water vapor form.

The long life and excellent grip characteristics both seem to evolve around the fact that the elastomer particles are thoroughly imbedded in the plastisol and firmly bonded in place. There is some integration through the previously described migration of the plasticizer so that the admixture tends to become one thorough heterogeneous coating, and apparently thereby effects more intimate contact and bonding between the plastisol and the elastomer.

One might well doubt the improved wear characteristics of this glove would actually exceed those of a glove coated with a reaction product of plastisol alone. Nonetheless, laboratory tests of materials made in accordance with this invention have shown two or three times the life of the usual glove coated with a plastisol alone.

Further, the normal expectations when elastomer particles are added to a plastisol covered glove, are considerably below those of the glove with a pure plastisol coating. Laboratory tests of wear characteristics of the usual elastomer particle coated glove will produce typically a result which is poorer than the glove coated only with a plastisol.

While the invention has been described with a great deal of detail, it is believed that it essentially resides in a glove having a fabric substrate and a heterogeneous protective coating of the reaction product of a plastisol and elastomer particles. The invention is also believed to include the method of making the improved glove.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A glove comprising a palm portion, a back portion, a thumb stall at least one finger stall, said stalls and portions being fastened together to form said glove, at least said palm portion comprising a fabric material having an outer coating, said coating comprising the fusion product of an admixture of a polyvinyl chloride plastisol with discrete elastomer particles dispersed therethrough.

2. The glove of claim 1 wherein said admixture is a composition of the following formula with respect to parts by weight:

| Material: | Parts |
|---|---|
| Polyvinyl chloride resin | About 100 |
| Plasticizer | About 100 to 150 |
| Stabilizer | About 4 to 6 |
| Filler | About 15 to 25 |
| 30 to 150 mesh neoprene sponge discrete particles | About 10 to 75 |

3. A glove comprising a palm portion, a back portion, a thumb stall, a plurality of finger stalls, said stalls and portions being fastened together to form said glove, said stalls and portions each being a fabric material having an outer coating, said coating comprising the fusion product of a composition having the following formula with respect to parts by weight:

| Material: | Parts |
|---|---|
| Polyvinyl chloride resin | About 100 |
| Plasticizer | About 120 |
| Stabilizer | About 4 |
| Filler | About 13 |
| 40 mesh elastomer system discrete particles | About 10 to 75 |

4. In a coated fabric glove the combination of, a coating comprised of the fusion product of a vinyl plastisol composition including the following materials with respect to parts by weight:

| Material: | Parts |
|---|---|
| Polyvinyl chloride | 100 |
| Elastomer particles | About 10 to 75, of from 20 to 55 mesh size |

5. In a coated fabric glove the combination of, a coating comprised of the fusion product of a vinyl plastisol composition including the following materials with respect to parts by weight:

| Material: | Parts |
|---|---|
| Plastisol | About 100 |
| Elastomer particles | From about 10 to about 50, of from 20 to 55 mesh size |

6. The article of claim 1, wherein the coating is air permeable and wherein the air permeability is about 2.5 cubic feet per minute per square foot as computed by measuring the pressure dropped in a partially evacuated chamber having an intake orifice covered by said article.

7. The glove of claim 1 wherein the coating is permeable.

8. The method of making a glove comprising providing a quantity of fabric material, formulating a plastisol, admixing a quantity of discrete elastomer particles with the plastisol, applying the admixture to a surface of at least some of the fabric material and thereafter curing the applied admixture, cutting the fabric into sections and securing the sections together to form a glove having palm and back portions and at least one finger and a thumb stall.

9. The method of claim 8 wherein the admixture is applied to the surface by knife coating.

10. The method of claim 8 wherein the admixture is applied to the surface by calender application.

11. The method of making a glove comprising, providing a quantity of fabric material, formulating a plastisol with the following formulation by weight:

| Material: | Parts |
|---|---|
| Polyvinyl chloride resin | About 100 |
| Plasticizer | About 120 |
| Stabilizer | About 4 |
| Filler | About 13 | and admixing from about 10 to 75 parts discrete elastomer particles of about 40 mesh with the plastisol, applying a coating of the admixture to a surface of at least some of the fabric material and thereafter curing the applied admixture, cutting the fabric into sections, securing the sections together to form a glove having a palm portion, a back portion, a thumb stall, and at least one finger stall.

12. The method of making a glove comprising, providing a quantity of fabric material, thoroughly mixing a plastisol admixture including about 100 parts by weight polyvinyl chloride and 10 parts by weight of discrete elastomer particles of from 20 to 55 mesh size, thereafter mixing up to 65 additional parts of the discrete elastomer particles of from 20 to 55 mesh size into the admixture, applying the admixture to a surface of at least a portion of the fabric material, thereafter curing the applied mixture, cutting the fabric into sections, and securing the sections together to form a glove having palm and back portions, a thumb stall, and at least one finger stall.

References Cited in the file of this patent

UNITED STATES PATENTS

| 25,192 | Goodyear | Aug. 23, 1852 |
| 2,181,247 | Montgomery | Nov. 28, 1939 |
| 2,678,081 | Rainard et al. | May 11, 1954 |

(Other references on following page)

UNITED STATES PATENTS

| | | | |
|---|---|---|---|
| 2,713,548 | White et al. | | July 19, 1955 |
| 2,735,786 | Schramm | | Feb. 21, 1956 |
| 2,873,450 | Brodeur | | Feb. 17, 1959 |
| 2,913,729 | Wisenburg | | Nov. 27, 1959 |

FOREIGN PATENTS 675,663  Great Britain _____ July 16, 1952

OTHER REFERENCES

Du Pont Reference, The Neoprenes, page 77, published by E. I. Du Pont & Co., 1953.